Patented Dec. 16, 1941

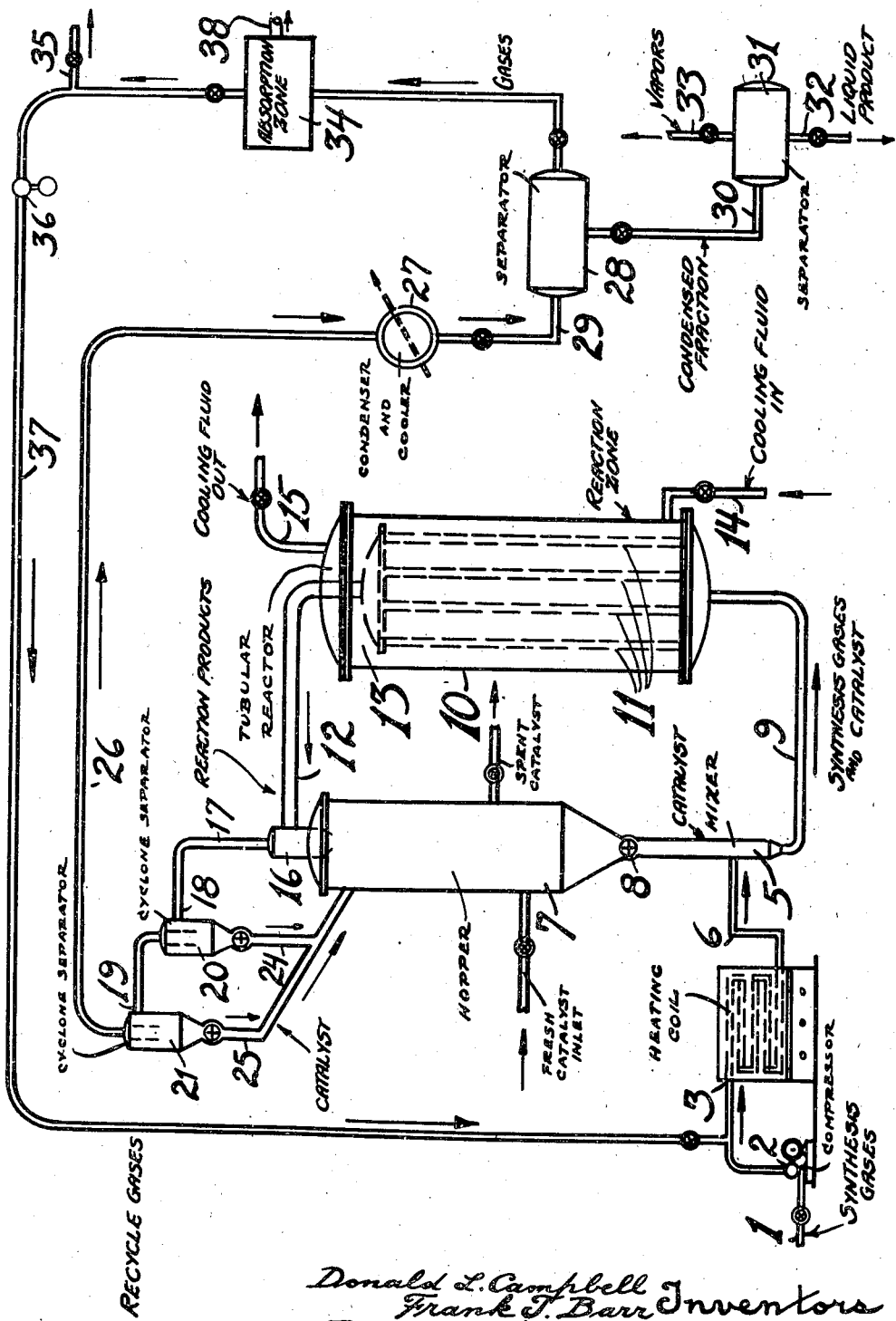

2,266,161

UNITED STATES PATENT OFFICE 2,266,161

PROCESS FOR REACTING HYDROGEN AND OXIDES OF CARBON

Donald L. Campbell, Short Hills, and Frank T. Barr, Summit, N. J., assignors to Standard Oil Development Company, a corporation of Delaware Application December 17, 1940, Serial No. 370,462

5 Claims. (Cl. 260—449)

The invention is more particularly directed to processes involving reactions of carbon monoxide and hydrogen, such as the production of methanol and other alcohols, "synthol" and similar mixtures of liquid hydrocarbons and oxyorganic compounds.

This invention, however, especially relates to the manufacture of hydrocarbon constituents containing more than one carbon atom in the molecule by a process involving the hydrogenation of oxides of carbon in which the rapid exothermic reaction is controlled in a manner that the temperature of the reaction does not vary without the predetermined critical temperature range whereby higher yields of products of improved quality are obtained. In accordance with the present invention the temperature of the reaction is controlled within the desired range by employing a powdered, suspended catalyst and tubular reaction zones operated under conditions to remove the heat of reaction by a cooling fluid circulated without the tubular reaction zones.

It is known in the art to conduct various exothermic chemical reactions and to remove the heat of reaction by various procedures. These procedures usually comprise circulating liquid cooling mediums within or without the reaction zone. While these methods of regulating and controlling temperatures are entirely satisfactory for most processes, they are not entirely satisfactory for controlling the temperatures within the critical narrow temperature range in operations involving the hydrogenation of oxides of carbon. In operations of this character a temperature gradient is created across the path of flowing synthesis gases in a manner that the synthesis gases adjacent to the external cooling medium are relatively cool as compared to the gases in the central area of the path of the flowing gases. The disadvantages resulting from the lack of adequate temperature control are particularly aggravated in the processes involving the production of hydrocarbon constituents containing more than one carbon atom in the molecule by the hydrogenation of carbon oxides.

Thus, in processes of this character in order to overcome the above-mentioned disadvantages and to satisfactorily control the temperature of the reaction zone, it has been the practice to employ reaction zones having relatively small diameters or tubular zones packed with a suitable catalyst. These reaction zones usually comprise parallel tubes of a relatively small diameter situated within one relatively large zone through which a cooling medium may be circulated, or comprise elements each consisting of one tube concentrically situated within a larger diameter tube or chamber, the intervening annular space being relatively thin. Indirect removal of the heat of reaction is accomplished by introducing a cooling medium in the area between the respective tubes or inside the inner tube of the concentrically tubed elements providing the catalyst be situated between the tubes respectively. While as stated above an operation of this character permits, under certain conditions, a means of satisfactorily controlling the temperature of the reaction, it possesses an inherent disadvantage in that owing to the necessity of using tubes having relatively small diameters, the capacity of the equipment is relatively low. This materially increases the cost of operations of this character and in many instances renders them commercially uneconomical.

For example, in processes in which relatively higher boiling hydrocarbon constituents are manufactured from carbon oxides and hydrogen it is essential that the temperature not vary substantially from the predetermined operating temperature. It is also preferred that the heat of reaction be removed as it is formed through the reaction zone usually by means of a cooling medium circulated without the wall. An increase in temperature of as little as 5° F. to 10° F. will oftentimes result in an increase in the rate of reaction so that a run-away temperature is experienced. When this occurs, the reaction rapidly shifts to the synthesis of methane and undesirable products to the complete exclusion of the desired liquid hydrocarbon products. Thus it is extremely desirable to maintain the temperature substantially uniform and constant throughout the reaction zone, at least so that it does not vary in excess of about a five degree limit. This may be accomplished by employing our invention, which comprises utilizing a suspended powdered catalyst and immediately removing the heat of the reaction indirectly along the path of flow of the reaction gases in the reaction zones by circulating a cooling medium without the reaction zones. The suspended powdered catalyst functions in a manner to make this form of heat removal ideal. Furthermore, our invention permits the use of tubes having diameters substantially greater than the ½ inch diameter tubes heretofore employed when using this desired method of removing the heat of reaction. When employing our invention, reaction tubes having diameters in the range above ½ inch may be employed, as for example, tubes having diameters of 1½ inches to 4 inches or as high as 8 inches.

The process of our invention may be readily understood by reference to the attached drawing illustrating modifications of the same. For the purposes of description, it is assumed that the synthesis gases comprise hydrogen and carbon oxides and that the operation is conducted under temperature and pressure conditions adapted to produce hydrocarbon constituents containing more than one carbon atom in the molecule and which boil within the motor fuel boiling range. The synthesis gases are introduced into the system by means of line 1. These gases are compressed, if necessary, by compression unit 2, passed through heating zone 3 which may comprise any suitable heating arrangement such as heat exchangers and the like, and are introduced into mixing zone 5 by means of line 6. In mixing zone 5 the synthesis gases are mixed with a suitable synthesizing catalyst which for the purposes of description is assumed to be a powdered cobalt catalyst deposited on a siliceous carrier. This catalyst is a powdered catalyst having a particle size of about 200 to 400 mesh and is withdrawn from catalyst storage 7 by means of star feeder arrangement 8 or equivalent means, and introduced into the heated synthesis gases. The synthesis gases containing suspended therein the powdered catalyst are withdrawn from mixing zone 5 by means of line 9 and introduced into synthesizing chamber 10 which comprises a parallel series of tubular reaction zones 11. The synthesis gases containing suspended therein the powdered catalyst flow upwardly through synthesizing zones 11 and are removed overhead from synthesizing chamber 10 by means of line 12. Temperature and pressure conditions are adjusted to secure the maximum yield of the desired products. The heat of reaction is removed by circulating a cooling fluid without said reaction zones 11 in the area 13. The cooling fluid is introduced by means of line 14 and withdrawn by means of line 15.

The reaction gases containing the suspended catalyst removed overhead by means of line 12 are introduced into separation zone 16 which comprises an integral part of catalyst storage zone 7. Separation zone 16 may comprise a centrifugal type of separation zone or any equivalent means adapted to remove the suspended catalyst from the reaction gases. Substantially the entire quantity of the suspended catalyst is removed from the reaction gases in separation zone 16 and falls downwardly into catalyst storage zone 7. The reaction gases, substantially free of the suspended catalyst, are removed by means of line 17 and passed serially through cyclone or equivalent separation means 20 and 21 by means of lines 18 and 19 respectively. In these separation zones the reaction gases are substantially completely freed of the suspended catalyst which is removed from the respective zones by means of lines 24 and 25 and returned to catalyst storage zone 7. The reaction gases substantially completely free of the suspended catalyst are removed overhead from separation zone 21 by means of line 26, passed to cooling zone 27 and introduced into separation zone 28 by means of line 29. The condensed fraction is withdrawn from separation zone 28 by means of line 30 and passed to a low pressure separation zone 31 from which the liquid product is removed by means of line 32. Under certain conditions, it is desirable to filter this product to recover catalyst not completely removed in the separation zones. Vaporous products are removed from separation zone 31 by means of line 33 and handled in any manner desirable. This fraction may be passed to an absorption or an equivalent zone for a more complete recovery of the desired hydrocarbon constituents. The vaporous product removed overhead from separation zone 28 is similarly handled in a manner to completely recover from the vaporous products the desired hydrocarbon constituents. This is preferably secured by passing the vaporous product to a conventional oil absorption operation which is illustrated as absorption zone 34. In absorption zone 34 the desirable hydrocarbon constituents are separated from the vapors and removed from the system by means of line 38. The uncondensed vaporous product, free of the desired hydrocarbon constituents may be withdrawn from the system by means of line 35 or compressed, if desired by compressor 36 and partially recycled to the system by means of line 37.

The process of the present invention may be widely varied. The invention essentially comprises employing a suspended powdered catalyst in a tubular reaction zone and immediately removing the heat of reaction along the path of flowing gases through the walls of the reaction zone. Under certain conditions it may be desirable to use in conjunction with the present method of removing the exothermic heat, other methods such as by removing heat of reaction by means of absorbing the heat as the sensible heat of the catalyst. By utilizing the present process it is possible to positively control the temperature within the desired very restricted temperature range and thus prevent undesirable and deleterious side reactions. Although the process may be adapted to the removal of exothermic heat of reaction and for maintaining a substantially constant temperature in any type of chemical reaction, it is particularly adapted for employment in operations for the production of relatively high boiling hydrocarbon constituents from oxides of carbon and hydrogen and related compounds produced by this reaction. These reactions, depending upon the character of the feed gases and yield of particular product desired, may be conducted under various temperature and pressure conditions. In general, however, in a process for the production of hydrocarbon constituents containing more than one carbon atom in the molecule it is preferred that the temperature of the reaction be in the range of about 370° F. to about 410° F. In order to secure satisfactory yields of the desired product, it is essential that the temperature variance from the operating temperatures does not exceed 10° F. and preferably not exceed 5° F. Exceptionally desirable results are obtained when the temperature is maintained substantially constant throughout the reaction zone. It is, however, to be understood that since more even reaction temperatures result throughout in using this invention, a controlled temperature variation in certain operations may be greater than the 10° F. critical figure usually given for fixed bed operation without producing a temperature runaway. Although the process lends itself to obtaining the exceptionally desirable results inherent in maintaining the temperature substantially constant throughout the reaction zone, it can be used in processes where temperature variation within the reactor is as much as, say, from 10 to 50° F., the exact limit depending on operating conditions, catalyst activity, etc.

Any suitable catalyst may be employed which will function to aid the reaction between the hydrogen and the oxides of carbon at the operating temperatures and pressures. Suitable catalysts are, for example, cerium, chromium, cobalt, manganese, osmium, palladium, titanium, zinc, iron, and oxides or other compounds of these metals. Mixtures of these catalysts may be employed or the same may be impregnated with suitable agents adapted to increase their efficiency or strength. The catalysts are in powdered form and preferably have a mesh in the range from 200 to 400.

By conducting the operation in accordance with the present process substantially the entire quantity of the heat of reaction is immediately removed through the tube wall of the reaction zone into the cooling jacket surrounding the catalytic reaction zone as the flowing gases pass through the zone. The heat of reaction is removed in an efficient and economical manner since optimum heat transfer rates are assured by the turbulence of the reaction gases and the powdered catalyst in a manner that local overheating is entirely prevented and the temperature across the path of the flowing gases is uniform. Thus it is possible to use reaction zones having a relatively large diameter whereby the capacity and throughput of the equipment is materially increased. The present process also permits the independent control of time of contact and catalyst concentration which results in better yields of improved products.

What we claim as new and wish to protect by Letters Patent is:

We claim:

1. Process for the production of reaction products having more than one carbon atom in the molecule, in a process involving the reaction of hydrogen and oxides of carbon, which comprises passing synthesis gases comprising hydrogen and oxides of carbon, and containing suspended therein a powdered catalyst, through a reaction zone, under temperature and pressure conditions adapted to react the oxides of carbon and hydrogen, removing exothermic heat of reaction immediately as it is formed along the path of the flowing gases in the reaction zone through the walls of said reaction zone by circulating a cooling medium without the walls of said reaction zone.

2. Improved process for the production of reaction products having more than one carbon atom in the molecule, in a process involving the reaction of hydrogen and oxides of carbon, which comprises passing synthesis gases comprising hydrogen and oxides of carbon, and containing suspended therein a powdered catalyst, through a relatively long and a relatively narrow reaction zone, under temperature and pressure conditions adapted to react the oxides of carbon and hydrogen, removing the exothermic heat of reaction immediately as it is formed along the path of the flowing gases in the reaction zone through the walls of said reaction zone by circulating a cooling medium without the walls of said reaction zone.

3. The process as defined by claim 2, in which the reaction zone has a diameter in the range of about one-half to about eight inches.

4. Improved process for the production of hydrocarbon constituents having more than one carbon atom in the molecule by a process involving the hydrogenation of oxides of carbon, which comprises passing synthesis gases comprising hydrogen and oxides of carbon containing suspended therein a powdered catalyst, through a relatively long and narrow reaction zone, under temperature and pressure conditions adapted to produce hydrocarbon constituents containing more than one carbon atom in the molecule, removing the exothermic heat of reaction immediately as it is formed along the path of flowing gases in said reaction zone through the walls of said reaction zone by a cooling medium maintained without said reaction zone.

5. The process as defined by claim 4, in which the reaction zone has a diameter in the range of one and one-half to four inches.

DONALD L. CAMPBELL.
FRANK T. BARR.